United States Patent
Levy et al.

(10) Patent No.: US 9,141,864 B2
(45) Date of Patent: Sep. 22, 2015

(54) REMOTE GAZE CONTROL SYSTEM AND METHOD

(75) Inventors: Isaac Levy, New York, NY (US); Tal Shalom, Fair Lawn, NJ (US); Meir Sela, Cresskill, NJ (US); Stephan Wenger, Hillsborough, CA (US)

(73) Assignee: Vidyo, Inc., Hackensack, NJ (US)

( * ) Notice: Subject to any disclaimer, the term of this patent is extended or adjusted under 35 U.S.C. 154(b) by 799 days.

(21) Appl. No.: 13/082,099

(22) Filed: Apr. 7, 2011

(65) Prior Publication Data

US 2011/0249136 A1    Oct. 13, 2011

Related U.S. Application Data

(60) Provisional application No. 61/322,129, filed on Apr. 8, 2010.

(51) Int. Cl.
*H04N 5/222* (2006.01)
*G06K 9/00* (2006.01)

(52) U.S. Cl.
CPC ............ *G06K 9/00912* (2013.01); *H04N 5/222* (2013.01)

(58) Field of Classification Search
CPC ..... H04N 13/02; H04N 7/18; H04N 5/23212; H04N 13/0239; H04N 13/0296; H04N 5/222; H04N 5/2222; G06K 9/00912; G06K 5/00; G06K 5/222; G06F 3/013
USPC .................... 348/14, 207, 333, 222.1, 333.99
See application file for complete search history.

(56) References Cited

U.S. PATENT DOCUMENTS

| | | | |
|---|---|---|---|
| 6,299,306 B1 * | 10/2001 | Braithwaite et al. | 351/208 |
| 6,637,883 B1 | 10/2003 | Tengshe et al. | |
| 7,154,526 B2 | 12/2006 | Foote et al. | |
| 7,437,679 B2 * | 10/2008 | Uemura et al. | 715/805 |
| 2002/0118287 A1 * | 8/2002 | Grosvenor et al. | 348/222.1 |
| 2003/0123069 A1 * | 7/2003 | Perala | 358/1.2 |
| 2004/0246123 A1 * | 12/2004 | Kawabe et al. | 340/506 |
| 2005/0007445 A1 * | 1/2005 | Foote et al. | 348/14.08 |
| 2005/0259173 A1 * | 11/2005 | Nakajima et al. | 348/333.12 |
| 2006/0209729 A1 * | 9/2006 | Staniec et al. | 370/270 |
| 2007/0263080 A1 | 11/2007 | Harrell et al. | |

(Continued)

FOREIGN PATENT DOCUMENTS

| JP | 3074677 | 8/2000 |
|---|---|---|
| JP | 2005-010512 | 1/2005 |
| JP | 2005-148245 | 5/2005 |

(Continued)

OTHER PUBLICATIONS

International Search Report for PCT/US2001/031562 mailed Jun. 28, 2011.

*Primary Examiner* — Roberto Velez
*Assistant Examiner* — Tuan Le
(74) *Attorney, Agent, or Firm* — Baker Botts, LLP

(57) ABSTRACT

The present invention provides techniques for directing the gaze of a subject whose image is captured by a camera, including the direction in which the subject looks, or the distance between the subject and the camera, in such a way that a visually appealing image can be captured by the camera, where a media professional (e.g., an interviewer or a director) or other person knowledgeable in media best practices is non co-located with the subject. The techniques enable the media professional to provide visual hints both manually and automatically to the remotely located subject.

3 Claims, 8 Drawing Sheets

(56) References Cited

U.S. PATENT DOCUMENTS

2008/0297589 A1* 12/2008 Kurtz et al. ............... 348/14.16
2011/0292054 A1* 12/2011 Boker et al. ................. 345/473

FOREIGN PATENT DOCUMENTS

| | | |
|---|---|---|
| JP | 2006-080978 | 3/2006 |
| JP | 2008-258718 | 10/2008 |

* cited by examiner

REMOTE GAZE CONTROL SYSTEM AND METHOD

CROSS-REFERENCE TO RELATED APPLICATIONS

This application claims the benefit of priority to U.S. Provisional Application Ser. No. 61/322,129, filed Apr. 8, 2010, which is hereby incorporated by reference herein in its entirety.

BACKGROUND

1. Field of Technology

The invention relates to a user interface in a TV production environment. More specifically, the invention relates to a method, a system, and a protocol, designed to enable a non co-located media professional (e.g., a director or producer) to direct the "gaze position" of the subject whose image is captured by the camera (i.e., the direction of the focus of the subject's visual sense or the direction in which the subject is looking) or the distance between the camera and subject, such that the camera can capture a visually appealing image.

2. Background Art

One scenario of TV production is an interview situation, in which a subject to be interviewed is physically in a location different than the interviewer's location. While it is quite common that the interviewers are media professionals who know how to physically appear in a way that is pleasing to the TV viewer, this is not necessarily the case for the interviewed subject. Accordingly, it can be helpful if media professionals (e.g., an interviewer, a producer, or a director) could provide the subject with hints on viewer-pleasing behavior. Alternatively, or in addition, it would be helpful if providing those hints could be automated.

Two areas of interest are the subject's "gaze" or "gaze position", i.e., the direction in which the subject looks, and the distance between the subject and the camera pickup location. On TV, an interview situation attempts to emulate and appropriately capture a direct conversation between, for example, an interviewer, a subject, and a TV viewer. Eye contact between all three entities is important for a visually pleasing experience for the TV viewer. Accordingly, the subject's gaze should be directed to the interviewer and the capturing camera. Similarly, it is visually pleasing if the subject's head or face is reproduced to convey the impression of a distance between the TV viewer and the subject that is neither too close (violating the "comfort space" of the TV viewer, which can depend, for example, on the TV viewer's cultural background) nor too far away (creating the impression of explicit distancing or remoteness). If the interviewer is physically present in the same location as the interviewer, neither goal is difficult to achieve. However, when the interviewer is located at a remote location (e.g., located in another studio), it can be necessary to provide a non media-professional subject with hints to direct his/her gaze appropriately, and to keep a certain distance from the camera.

In studio environments, gaze, distance, and similar control can be provided by many different mechanisms. For example, a human technician can direct the gaze of the subject by moving the camera's physical position, or by gesturing to the subject to direct his/her gaze in a certain way. One example of a technical mechanism is the "on air" light that a studio TV camera can have on its casing. Dedicated lights can also be used to direct the gaze of the subject. A subject can be advised and trained before the interview, for example, to always focus on the "on air" light that many studio cameras include, or on a dedicated light used for this purpose. Cameras, under the control of professional operators, can also be moved to capture the most pleasing visual angle. As for distance control, camera zooming under the control of a professional operator is one approach in a studio environment.

An area of interest relating to a subject's gaze involves tracking the viewing direction of the subject's eyes, for example, by observing the iris in relation to the rest of the head or face, or by identifying the head or face of the subject in relation to other body parts and the background. Head and eye tracking mechanisms and algorithms have been previously studied widely. For introductory material, see, for example, Salvucci, Goldberg, "Identifying fixations and saccades in eye-tracking protocols", Proceedings of the 2000 symposium on Eye tracking research & applications, pp. 71-78, Palm Beach Gardens, Fla., United States, SBN:1-58113-280-8, also available from http://portal.acm.org/citation.cfm?id=355028, and references therein.

SUMMARY

The present invention provides techniques for directing the gaze of a subject whose image is captured by a camera, including the direction in which the subject looks, and the distance between the subject and the camera, in such a way that a visually appealing image can be captured by the camera, where a media professional (e.g., an interviewer or a director) or other person knowledgeable in media best practices is non co-located with the subject. The techniques enable the media professional to provide hints both manually and automatically to the remotely located subject.

In one exemplary embodiment, the hint can be an explicit instruction visually displayed to the subject. In the same or another embodiment, the hint can be a visual hint other than an explicit instruction visually displayed to the subject. In the same or another embodiment, the hint can be provided by a dedicated device. In the same or another embodiment, an image analyzer can determine and influence the subject's gaze position or the distance between the subject and the camera. In the same or another embodiment, the subject's gaze position or the distance between the subject and the camera can be determined manually.

Figure 1:
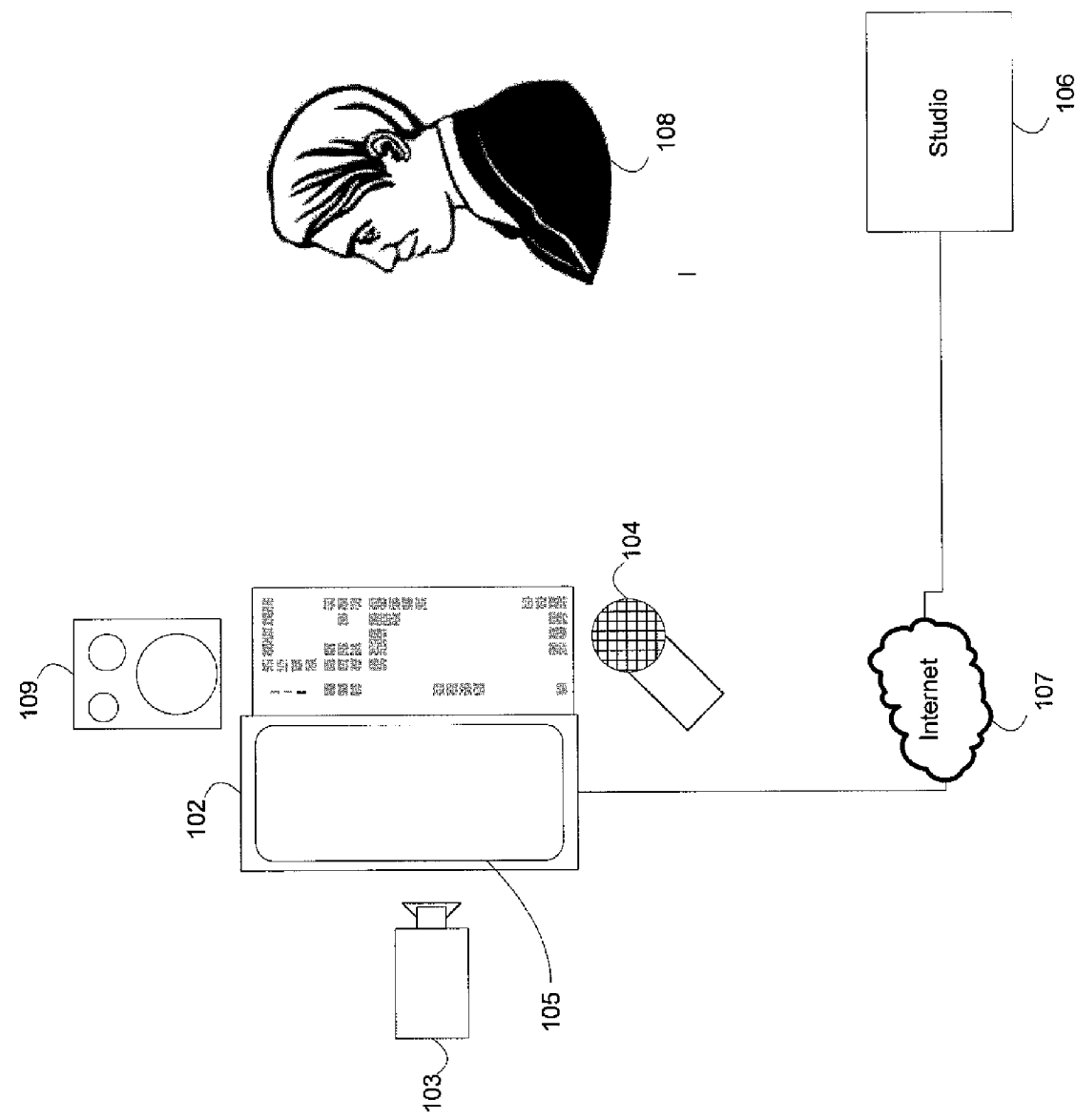
FIG. 1 is a block diagram illustrating a high level system for remotely directing a subject's gaze and the distance between the subject and the camera in accordance with the present invention.

Throughout the drawings, the same reference numerals and characters, unless otherwise stated, are used to denote like features, elements, components or portions of the illustrated embodiments. Moreover, while the disclosed invention will now be described in detail with reference to the figures, it is done so in connection with the illustrative embodiments.

DETAILED DESCRIPTION OF THE INVENTION

The invention presented is useful in environments where a camera captures the image of a human subject. As a non-limiting example, an interview subject can have little or no training in best media practices and be located in somewhere other than a professional studio, where there is no knowledgeable media professional knowledgeable that can instruct the subject concerning gaze position and distance from the camera (e.g., an interviewer).

As depicted in FIG. 1, in one exemplary embodiment, the invention can be used in a street interview situation. A technician can, for example, set up a portable media capture device, e.g., a laptop (102), which can be equipped with a camera (103), microphone (104), and video display (the laptop screen) (105). However, the present invention envisions that other media capture device(s) and audiovisual equipment can be used. The laptop can be connected to the studio (106) via a data link (107) using, for example, the Internet, over a mobile, wireless, or wired access link. The technician can direct the laptop (102) and the subject (108) such that the subject can view the laptop screen (105) and the subject is in the camera's (103) viewing angle. The camera (103) can be fixed to the laptop (102), and can be fixed-focus (i.e., no zoom capability). Over the same or another data link (107), the laptop (102) can receive information to be displayed on the screen (105) and/or made available to the subject (108) using one or more audio output devices (109), for example, loudspeakers.

Figure 2:
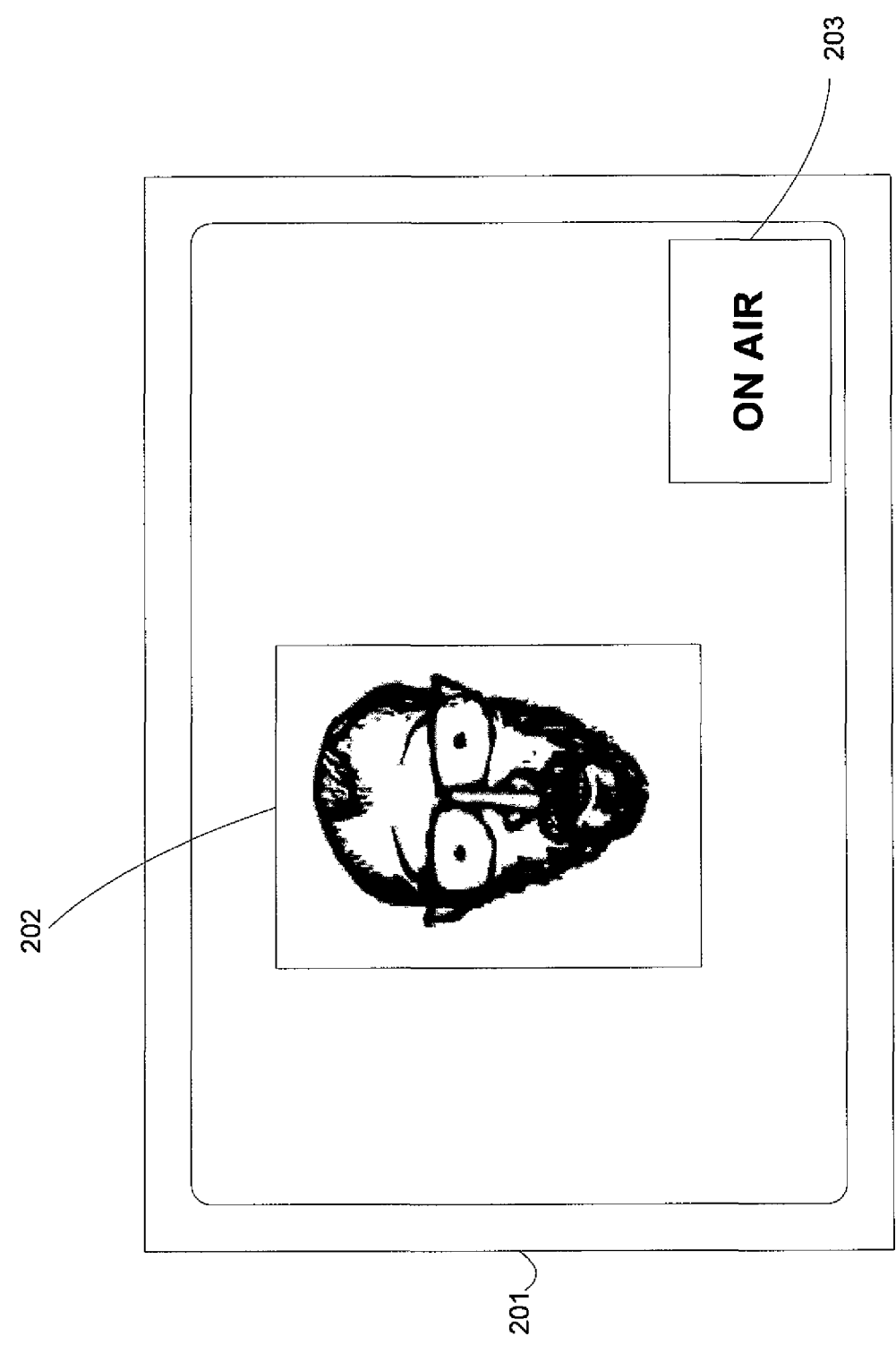
FIG. 2 illustrates an exemplary video display in accordance with the present invention.

FIG. 2 depicts exemplary screen content displayed on an exemplary video display (201) connected to the portable media capture device (i.e., the laptop screen). In an interview scenario, it is helpful that the subject being interviewed receives (subjectively) real-time feedback from the remote interviewer; hence, there can be one window (202) that shows an image of the interviewer. Further, there can be an indication or explicit warning (203) indicating whether or not the subject is "on air". The screen can show other content as well; however, in certain situations, other content may be distracting and therefore, can be omitted.

As the laptop's screen can be set up for viewing by the subject, the screen can be used to provide visual hints to the subject. For example, if the subject loses eye contact with the camera lens, as detected in the studio (by human or automated monitoring as described below), the screen can flash a warning message such as "Look into the camera!" In the same or another embodiment, the video display could flash "Move closer!" or "Move away!" when it is detected in the studio (by human or automated means) that the subject is too close or too far away from the camera lens. However, such a direct interaction can lead to less than ideal behavior by the subject. For example, a subject that has been briefed that eye contact is important could, upon receiving a warning, feel embarrassed that he/she is not behaving professionally, which can have negative implications for the quality of the interview—for example, the subject can lose his/her train of thought or could blush. Similarly, a subject can feel embarrassed if he/she is briefed on the ideal distance between his/her head or face and the camera, but nevertheless moves away from that distance and receives an explicit warning message on the screen. Therefore, there exists a need for techniques for providing the subject with more subtle directions.

Figure 3:
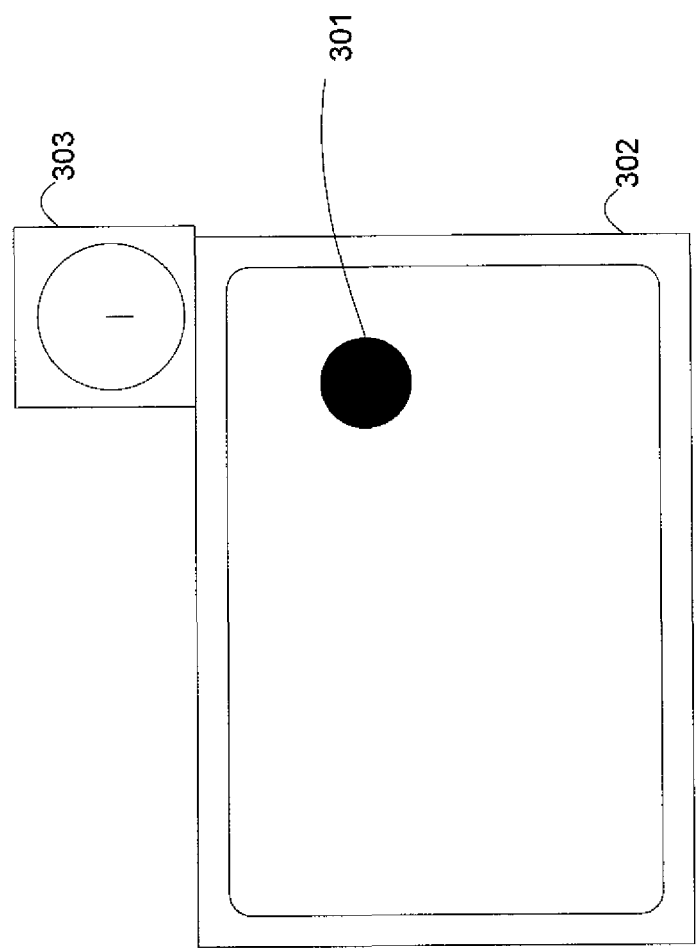
FIG. 3 illustrates an exemplary video display and camera in accordance with the present invention.

Referring to FIG. 3, in one exemplary embodiment of the invention, a subtle direction can include displaying a visual hint (301) displayed on the screen (302) that attracts the subject's attention without instructing the subject by displaying an express message, such that the subject changes his/her gaze position or distance from the camera when he/she focuses on the visual hint, which results in a more appealing image. The visual hint can, for example, include a blinking dot in a contrasting color (relative to the screen background).

A good gaze position can be one where the subject appears to focus as closely to the camera lens as possible; accordingly, the visual hint can be located close to the position of the camera (303), and can be moved in order to direct the subject's gaze position towards the visual hint (301). (The camera (303) is depicted as viewed from the front, with the circle representing the lens; the camera's center of view axis is perpendicular to the drawing's plane.) The size of the visual hint (301) can, for example, vary depending on the preferred distance of the subject to the camera (303), the subject is likely to move closer to the laptop (302) screen (and by virtue of a camera installed in the laptop, closer to the camera, if the visual hint gets smaller), whereas the subject is likely to move away from the laptop screen (and camera) if the visual hint gets larger.

It should be noted that certain psycho-optical effects can be achieved by deliberately moving the visual hint away from the spot closest to the camera position. For example, if the visual hint is placed significantly below the centerline of the camera viewing field, the subject is likely to focus on the visual hint, and can give the impression of being subdued, even if the subject does not intend to present such an impression. If the visual hint is placed significantly above the centerline of the camera viewing field, the subject is likely to focus on the visual hint and can cause the subject to appear as if he/she believes himself/herself to be "above the audience", even arrogant. Similarly, moving the visual hint to the right or left of the camera viewing field can cause the appearance that the subject is not paying attention to the interviewer and is rather interested in something else. Corresponding effects can be achieved by deliberately selecting smaller or larger visual hints, even if the subject is positioned at an appropriate distance from the camera.

Other uses of visual hint positions are also conceivable. For example, if the setting were not an interview situation, but rather a shooting of a movie, the subject (here, an actor) can be provided with visual hints to direct the actor's viewing direction and camera distance as desired by a remotely located media professional (e.g., the director). While most actors should be able to follow abstract screen commands, the use of a visual hint offloads the actor from reading and executing the director's intentions, freeing the actor's mind to focus on other aspects of his/her acting.

Figure 4:
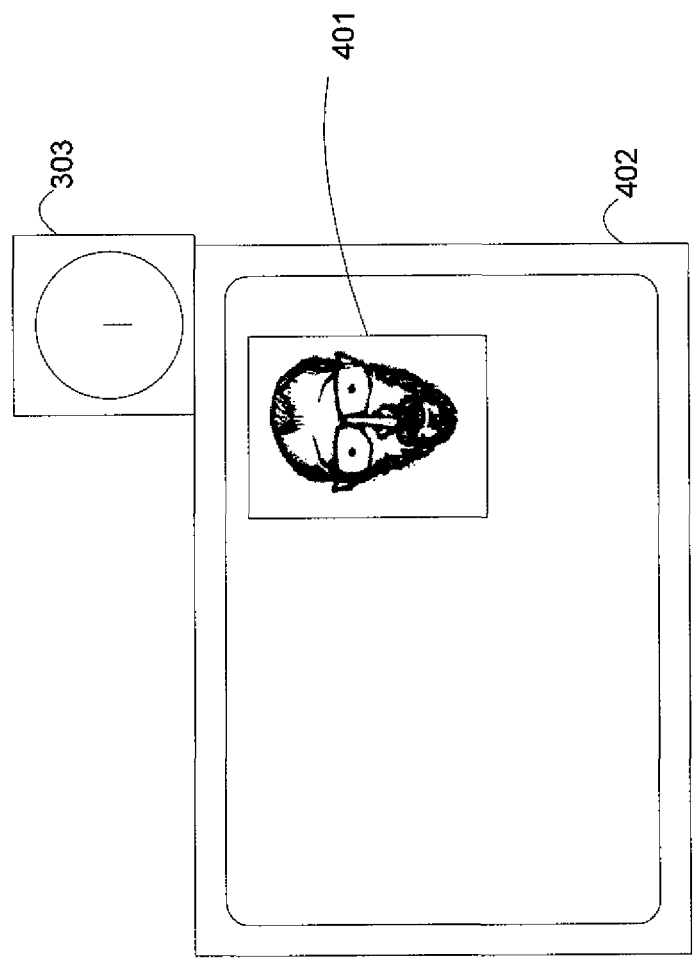
FIG. 4 illustrates an exemplary video display and camera in accordance with the present invention.

Referring to FIG. 4, in the same or another embodiment, the visual hint can be the position of the interviewer's window (401) on the screen (402). Using the interviewer's window (401) has an advantage over other types of visual hint since, in some cultures, a subject naturally keeps eye contact with a human communication partner and observes minimum and maximum distance from the partner—even if the partner is only visible on a screen (402). By providing the visual hint in the form of the interviewer's window (401) on the screen (402) in various positions and sizes, the subject is more likely to intuitively adjust his/her gaze and distance from the screen (402) (and camera, assuming an appropriate camera placement) than with a more abstract visual hint.

Figure 5:
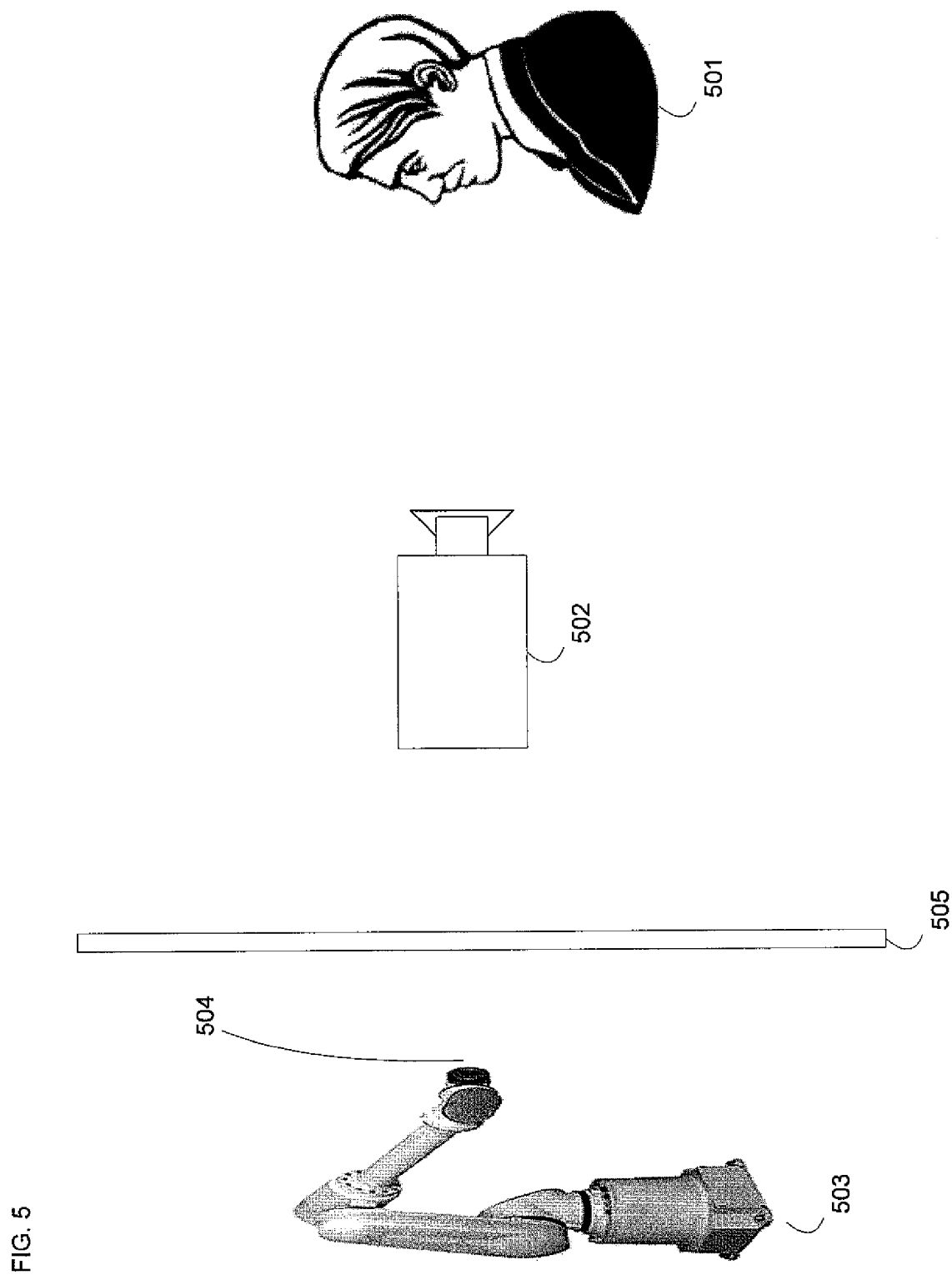
FIG. 5 illustrates an exemplary mechanical device for moving a visual hint in accordance with the present invention.

In the same or another embodiment, a visual hint can also be provided by a dedicated device, rather than, or in addition to, a screen. For example, as depicted in FIG. 5, a mechanical device can be used to position and/or resize the visual hint. The subject (501) and the camera (502) can be located in a fixed position. A device in the form of, for example, an industry robot (503), can display a visual hint (here in the form of a lamp (504) such that the visual hint can be moved in the field of view of the subject). The industrial robot (503) can be hidden behind a semi-transparent wall (505) that lets the light of the lamp (504) pass through, but otherwise hides the robot (503), so as not to distract the subject (501). The present invention envisions that many other implementations of mechanisms can be used to display the visual hint.

Figure 6:
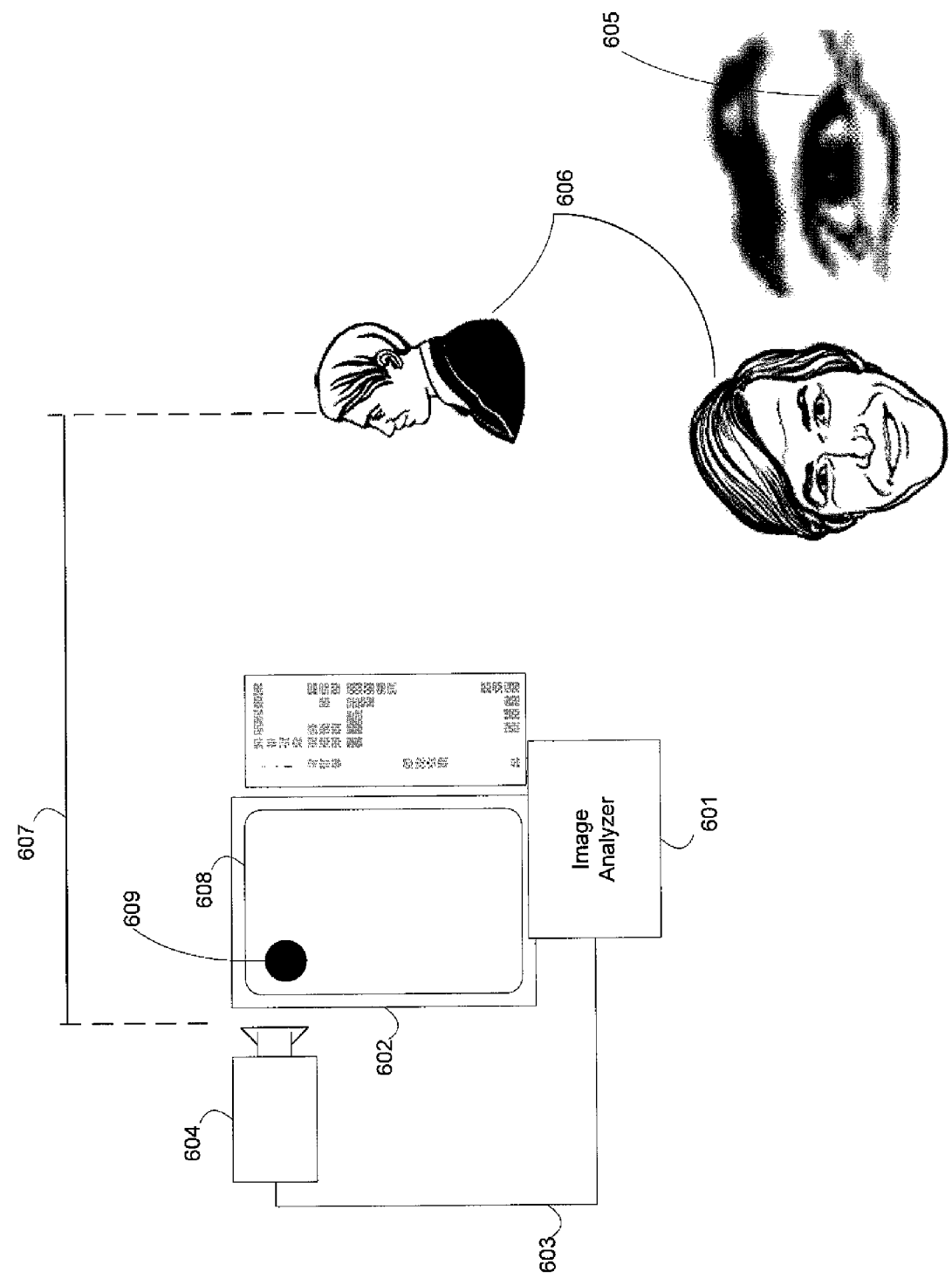
FIG. 6 is a block diagram illustrating a high level system for remotely directing a subject's gaze and the distance between the subject and the camera in accordance with the present invention.

Referring to FIG. 6, in an exemplary embodiment, an image analyzer (601), which can be implemented as hardware or software embedded locally on the laptop (602), can analyze the camera signal (603) as captured by the camera (604). The signal analysis can include, for example, an identification of the iris position (605) of the subject (606) or a heuristic measurement of the distance (607) between the camera (604) and the subject (606) (e.g., by correlating the average size of a subject's head or face, camera viewing angle, and the number of pixels occupied by the depiction of the head or face in the video stream). If, for example, the subject (606) were focusing on an area outside of the ideal camera viewing centerline, the image analyzer could identify this situation and arrange the laptop screen (608) such that the visual hint (609) is moved towards the centerline of the camera view. Similarly, the image analyzer (601) can determine the distance between the head or face of the subject (606) and the camera (604) and arrange the laptop screen (608) such that the visual hint (609) is modified so as to reflect the direction the subject (606) has to move (closer or farther away from the camera) for an ideal position.

Figure 7:
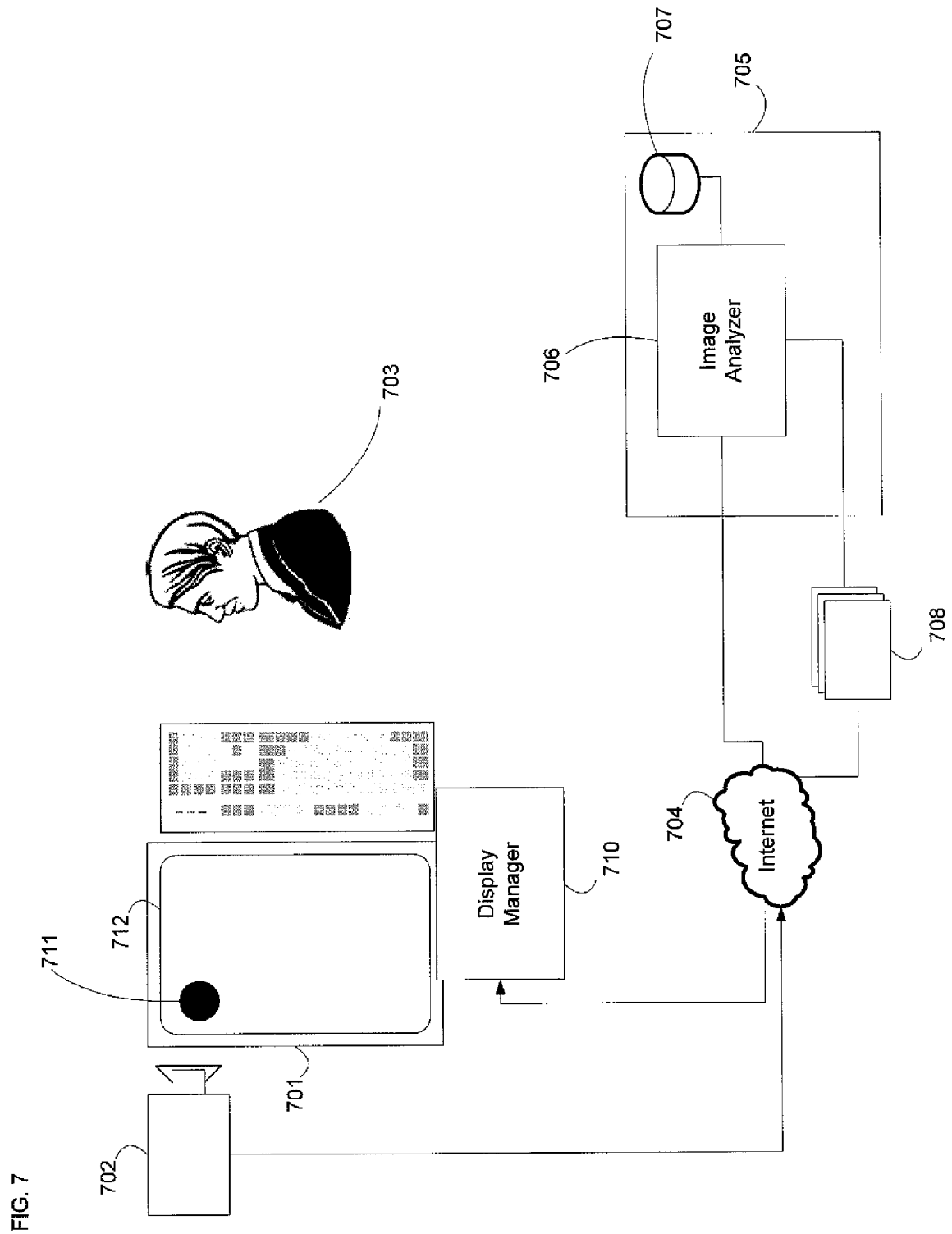
FIG. 7 is a block diagram illustrating a high level system for remotely directing a subject's gaze and the distance between the subject and the camera in accordance with the present invention.

In the same or another embodiment, an image analyzer comparable to the one discussed above can be implemented in equipment located in the studio. This has an advantage because the complex and potentially expensive image analysis software/hardware does not need to be run on a battery powered, and certainly CPU power constrained, laptop, or other similar field equipment, or be co-located with the laptop. Referring to FIG. 7, the laptop's (701) camera (702) captures the subject (703), and the resulting video stream, which can be compressed by the camera or laptop, is sent by the camera or laptop through the network (704) (e.g., the Internet) to the studio (705). In the studio (705), the video stream is used for whatever post-production processes the studio may require, put on air and/or stored for future use. Further, however, the video stream is also fed into an image analyzer (706).

The image analyzer (706) analyzes the video stream according to guidelines (707) can be fixed or configurable. One guideline, for example, can provide that a position of a visual hint (711) must be generated so as to optimize the eye contact of the subject (703) with the camera (702), by moving the visual hint (711) to a position as close as possible to the camera (702) viewing centerline. Another guideline (707) can, for example, provide that the size of a visual hint (711) should be adjusted depending on the most visual pleasing distance of the subject (703) to the camera (702)—if the subject needs to move closer to the camera position, the hint is reduced in size, and if the subject needs to move farther away from the camera position, the hint is enlarged in size. Both of these exemplary guidelines (707) can be accomplished, for example, by identifying the subject's (703) iris position and face spatial area out of the content of the video stream, and creating an updated position and size for the visual hint (711) that, when followed by the subject (703), would move the subject's focus closer to the camera (702) viewing centerline and/or closer/farther away from the camera.

Once created, the position can be encapsulated by a protocol, and Protocol Data Units (PDUs) ((708)) of the protocol can be conveyed over the network to the laptop (701). A display manager (710) in the laptop (701) receives the PDUs (708), interprets their content (the updated positions), and moves the visual hint (711) accordingly on the laptop screen (712).

Figure 8:
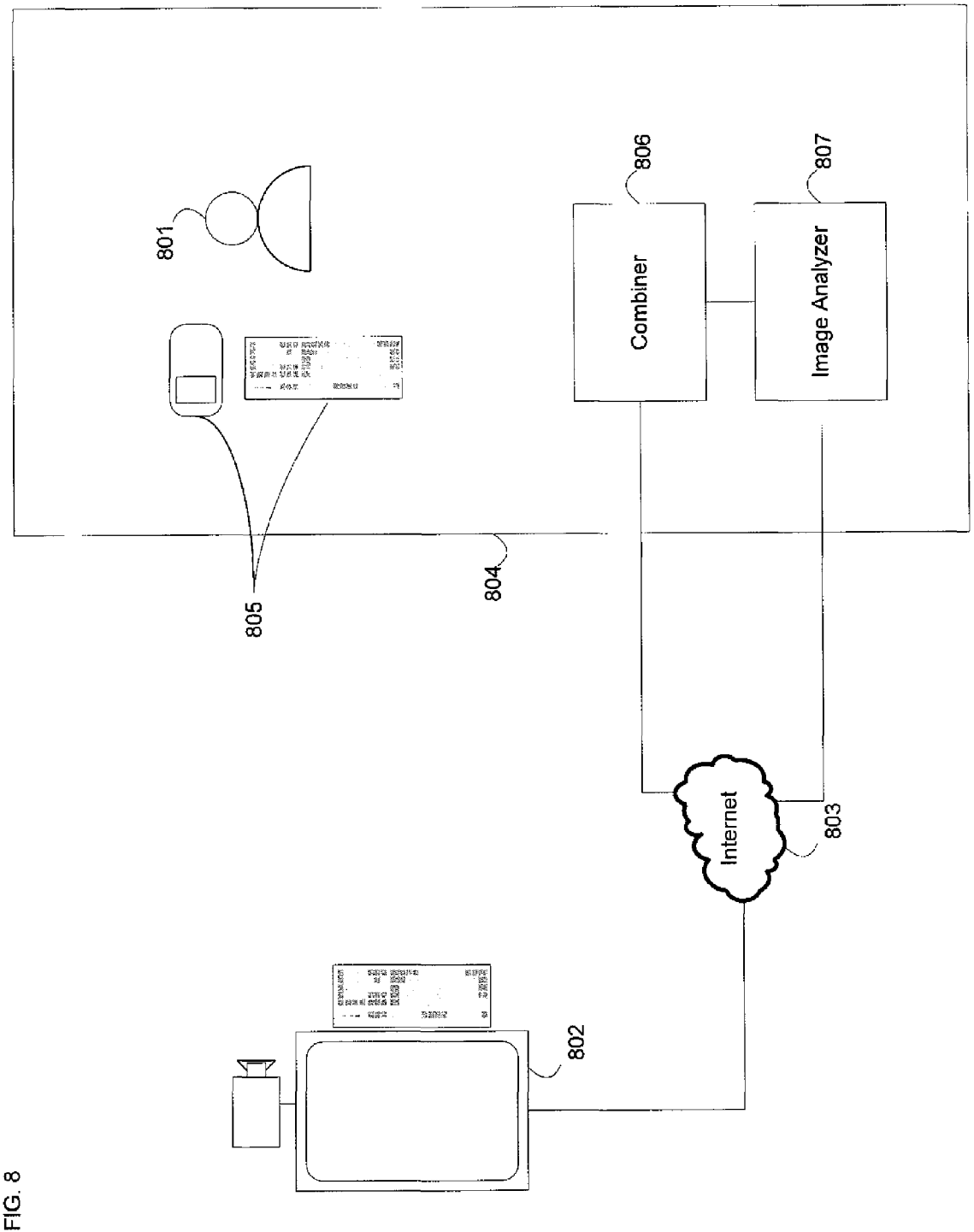
FIG. 8 is a block diagram illustrating a high level system for remotely directing a subject's gaze and the distance between the subject and the camera in accordance with the present invention.

In the same or another embodiment, the position or size of the visual hint can also be influenced or determined manually. Referring to FIG. 8, a human operator (801) (e.g., a movie director) located at the studio (804) can monitor the video stream that has been captured by the laptop's (802) camera and sent by the laptop (802) or camera, which can be compressed by the camera or laptop, though the network (803) to the studio (804). Through appropriate input mechanism(s) (805) (e.g., a mouse, joystick, or keyboard), the operator can provide visual hints to a combiner (806), that can also receive input from an image analyzer (807) as described above. The combiner combines the input from the operator (801) with the output of the image analyzer (807) and forms PDUs containing visual hint positions and size, which are conveyed over the network (803) to the laptop (802) for display.

We claim:

1. A media capture device, comprising:
   (a) a camera adapted for capturing one or more images of a human subject, a portion of which corresponds to an iris,
   (b) an image analyzer, operatively coupled to the camera, for analyzing the one or more captured images to determine a current iris position of the human subject and a current distance between the human subject and the camera, and calculating at least one position characteristic comprising a desired distance between the human subject and the camera, and a desired gaze direction, and
   (c) a screen, operatively coupled to the image analyzer, the screen content configured to subtly direct the human subject to assume the at least one position characteristic by displaying a visual hint, wherein the size of the visual hint varies depending on the desired distance between the human subject and the camera, and the visual hint moves on the screen in a direction of the desired gaze direction.

2. A method, comprising:
   (a) receiving and analyzing, using at least one studio equipment, one or more images of a human subject to determine an iris position of the human subject and a current distance between the human subject and a camera, from at least one media capture device;
   (b) calculating at least one position characteristic comprising a desired distance between the human subject to the camera and a desired gaze direction;
   (c) sending, using the at least one studio equipment, the at least one position characteristic to the at least one media capture device; and
   (d) displaying, on a screen, a visual hint in accordance with the at least one position characteristic, wherein the size of the visual hint varies depending on the desired distance between the human subject and the camera, and the visual hint moves on the screen in a direction of the desired gaze direction.

3. The method of claim 2, wherein the at least one position characteristic is determined by at least one of an at least one human operator, an at least one image analyzer, or an at least one combiner.

\* \* \* \* \*